United States Patent
Aliakseyeu et al.

(10) Patent No.: US 9,763,308 B2
(45) Date of Patent: Sep. 12, 2017

(54) SYSTEMS AND METHODS FOR CALIBRATING EMITTED LIGHT TO SATISFY CRITERION FOR REFLECTED LIGHT

(71) Applicant: PHILIPS LIGHTING HOLDING B.V., Eindhoven (NL)

(72) Inventors: Dzmitry Viktorovich Aliakseyeu, Eindhoven (NL); Tatiana Aleksandrovna Lashina, Eindhoven (NL); Bartel Marinus Van De Sluis, Eindhoven (NL); Philip Steven Newton, Waalre (NL); Tim Dekker, Eindhoven (NL)

(73) Assignee: PHILIPS LIGHTING HOLDING B.V., Eindhoven (NL)

(*) Notice: Subject to any disclaimer, the term of this patent is extended or adjusted under 35 U.S.C. 154(b) by 0 days.

(21) Appl. No.: 15/111,652

(22) PCT Filed: Jan. 8, 2015

(86) PCT No.: PCT/IB2015/050136
§ 371 (c)(1),
(2) Date: Jul. 14, 2016

(87) PCT Pub. No.: WO2015/107436
PCT Pub. Date: Jul. 23, 2015

(65) Prior Publication Data
US 2016/0338174 A1    Nov. 17, 2016

Related U.S. Application Data

(60) Provisional application No. 61/927,169, filed on Jan. 14, 2014.

(51) Int. Cl.
H05B 33/08    (2006.01)
H05B 37/02    (2006.01)

(52) U.S. Cl.
CPC ..... *H05B 37/0227* (2013.01); *H05B 37/0218* (2013.01); *H05B 37/0272* (2013.01); *Y02B 20/46* (2013.01)

(58) Field of Classification Search
CPC combination set(s) only.
See application file for complete search history.

(56) References Cited

U.S. PATENT DOCUMENTS

| | | | |
|---|---|---|---|
| 2008/0203928 A1* | 8/2008 | Frumau et al. | H05B 37/029 315/151 |
| 2009/0184648 A1* | 7/2009 | Colak | H05B 33/0863 315/158 |
| 2011/0109445 A1 | 5/2011 | Weaver et al. | |

* cited by examiner

*Primary Examiner* — Douglas W Owens
*Assistant Examiner* — Jianzi Chen
(74) *Attorney, Agent, or Firm* — Meenakshy Chakravorty

(57) ABSTRACT

Disclosed is a computing device that may obtain data indicative of light reflected from a surface and sensed by a light sensor of a mobile computing device. In various embodiments, the reflected light may be created from light emitted by a lighting unit, and the computing device may determine that, based on the data representing one or more properties of the reflected light, a property of the reflected light fails to satisfy a lighting property criterion. In various embodiments, the computing device may cause calibration of light emitted by the lighting unit so that the reflected light satisfies the lighting property criterion.

20 Claims, 5 Drawing Sheets

SYSTEMS AND METHODS FOR CALIBRATING EMITTED LIGHT TO SATISFY CRITERION FOR REFLECTED LIGHT

CROSS-REFERENCE TO PRIOR APPLICATIONS

This application is the U.S. National Phase application under 35 U.S.C. §371 of International Application No. PCT/IB2015/050136, filed on Jan. 8, 2015, which claims the benefit of U.S. Provisional Patent Application No. 61/927,169, filed on Jan. 14, 2014. These applications are hereby incorporated by reference herein.

TECHNICAL FIELD

The present invention is directed generally to lighting control. More particularly, various inventive methods and apparatus disclosed herein relate to calibrating light emitted by a lighting unit to satisfy a lighting property criterion for reflected light.

BACKGROUND

Digital lighting technologies, i.e., illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. Some of the fixtures embodying these sources feature a lighting module, including one or more LEDs capable of producing different colors, e.g., red, green, and blue, as well as a processor for independently controlling the output of the LEDs in order to generate a variety of colors and color-changing lighting effects.

Lighting effects projected onto surfaces by light sources such as LEDs may exhibit various lighting properties depending on the nature of the surfaces. For example, light emitted by a lighting unit (e.g., a luminaire) onto one surface may be reflected differently than the same light emitted by the same lighting unit (or the same type of luminaire) onto another surface. In some cases, the two different instances of reflected light may appear differently, e.g., to a human eye.

There may be scenarios in which it is desirable that light reflected from different surfaces be relatively uniform, or that light reflected from a particular surface has one or more selecting properties. Some lighting units may already be configurable to adjust various properties of light they emit. However, equipping such a lighting unit with components necessary to automatically calibrate its light, such as a light sensor (e.g., a camera), may be prohibitively expensive and/or impracticable. Thus, there is a need in the art to provide methods and apparatus for adjusting one or more properties of light emitted by a lighting unit, without adding components to that lighting unit, so that when light emitted by that lighting unit is reflected off a surface, it satisfies one or more lighting property criteria.

SUMMARY

The present disclosure is directed to inventive methods and apparatus for lighting control. Generally, in one aspect, the invention focuses on a computer-implemented method including the following steps: obtaining, by a computing device, data indicative of light reflected from a surface and sensed by a light sensor of a mobile computing device, wherein the reflected light is created from light emitted by a lighting unit; determining, by the computing device based on the data representing one or more properties of the reflected light, that a property of the reflected light fails to satisfy a lighting property criterion; and causing, by the computing device, calibration of light emitted by the lighting unit so that the reflected light satisfies the lighting property criterion.

In various embodiments, the lighting property criterion is satisfied when a value of the property of the reflected light falls within a range of values. In various versions, the method further includes determining, by the computing device, the range of values from an image of light emitted by another lighting unit onto another surface. In various versions, the method further includes determining, by the computing device, the range of values based on user selection. In various versions, the method further includes determining, by the computing device, the range of values based on a desired size of a projected light effect.

In various embodiments, the obtaining is performed in response to a determination, by the computing device, that the mobile computing device is within a predetermined proximity of the lighting unit. In various embodiments, the obtaining is performed in response to a determination, by the computing device, that the mobile computing device is in wireless communication with the lighting unit. In various versions, the determination that the mobile computing device is in wireless communication with the lighting unit comprises a determination that the mobile computing device has established near field communication (NFC) with the lighting unit. In various versions, the causing comprises causing the mobile computing device to transmit, to the lighting unit, a wireless signal carrying an instruction to alter one or more properties of light emitted by the lighting unit onto the surface.

In various embodiments, the method may further include the following operations: obtaining, by the computing device from one or more other sensors associated with the mobile computing device, data indicative of a physical arrangement of the mobile computing device; determining, by the computing device based on the data indicative of the physical arrangement of the mobile computing device, that the physical arrangement of the mobile computing device fails to satisfy a physical arrangement criterion; and causing, by the computing device, the mobile computing device to provide output prompting a user to alter the physical arrangement of the mobile computing device to satisfy the physical arrangement criterion. In various versions, the physical arrangement includes an orientation or location of the mobile computing device relative to the lighting unit or the surface.

In various embodiments, the obtaining, determining and causing are performed by the mobile computing device. In various embodiments, the obtaining, determining and causing are performed by a bridge that controls a lighting system with which the lighting unit is associated. In various embodiments, the obtaining, determining and causing are performed by a computing server in communication with the mobile computing device over one or more computer networks. In various embodiments, the obtaining, determining and causing are performed by the lighting unit.

In another aspect, the invention focuses on a mobile computing device that includes the following: one or more processors; a light sensor operably coupled with the one or more processors; and memory operably coupled with the one or more processors and storing a lighting property criterion and instructions that, in response to execution of the instructions by the one or more processors, cause the one or more processors to: obtain data indicative of light reflected from a surface and sensed by the light sensor, wherein the reflected light is created from light emitted by a lighting unit; determine, based on the data representing one or more properties of the reflected light, that a property of the reflected light fails to satisfy the lighting property criterion; and cause calibration of light emitted by the lighting unit so that the reflected light satisfies the lighting property criterion.

In various embodiments, the memory further stores instructions that, in response to execution of the instructions by the one or more processors, cause the one or more processors to obtain the data indicative of light reflected from the surface in response to a determination that the mobile computing device is within a predetermined proximity of the lighting unit.

In various embodiments, the memory further stores instructions that, in response to execution of the instructions by the one or more processors, cause the one or more processors to obtain the data indicative of light reflected from the surface in response to a determination that the mobile computing device is in wireless communication with the lighting unit.

In various embodiments, the mobile device may further include one or more other sensors operably coupled with the one or more processors. The memory may further store instructions that, in response to execution of the instructions by the one or more processors, cause the one or more processors to: obtain, from the one or more other sensors, data indicative of a physical arrangement of the mobile computing device; determine, based on the data indicative of the physical arrangement of the mobile computing device, that the physical arrangement of the mobile computing device fails to satisfy a physical arrangement criterion; and provide output prompting a user to alter the physical arrangement of the mobile computing device to satisfy the physical arrangement criterion.

In various versions, the lighting property criterion is satisfied when a value of the property of the reflected light falls within a range of values, and the range of values is based on an image of light emitted by another lighting unit onto another surface, user selection, or a desired size of a projected light effect.

In another aspect, a lighting system bridge may include: one or more processors; and memory operably coupled with the one or more processors and storing a lighting property criterion and instructions that, in response to execution of the instructions by the one or more processors, cause the one or more processors to: determine that a mobile computing device is within a predetermined proximity of a lighting unit of the lighting system; obtain, from the mobile computing device, data indicative of light reflected from a surface and sensed by a light sensor associated with the mobile computing device, wherein the reflected light is created from light emitted by the lighting unit; determine, based on the data representing one or more properties of the reflected light, that a property of the reflected light fails to satisfy the lighting property criterion; and calibrate light emitted by the lighting unit so that the reflected light satisfies the lighting property criterion.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above).

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

The term "color temperature" generally is used herein in connection with white light, although this usage is not intended to limit the scope of this term. Color temperature essentially refers to a particular color content or shade (e.g., reddish, bluish) of white light. The color temperature of a given radiation sample conventionally is characterized according to the temperature in degrees Kelvin (K) of a black body radiator that radiates essentially the same spectrum as the radiation sample in question. Black body radiator color temperatures generally fall within a range from approximately 700 degrees K (typically considered the first visible to the human eye) to over 10,000 degrees K; white light generally is perceived at color temperatures above 1500-2000 degrees K.

Lower color temperatures generally indicate white light having a more significant red component or a "warmer feel," while higher color temperatures generally indicate white light having a more significant blue component or a "cooler feel." By way of example, fire has a color temperature of approximately 1,800 degrees K, a conventional incandescent bulb has a color temperature of approximately 2848 degrees K, early morning daylight has a color temperature of approximately 3,000 degrees K, and overcast midday skies have a color temperature of approximately 10,000 degrees K. A color image viewed under white light having a color temperature of approximately 3,000 degree K has a relatively reddish tone, whereas the same color image viewed under white light having a color temperature of approximately 10,000 degrees K has a relatively bluish tone.

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Lighting effects projected onto surfaces by light sources such as LEDs may exhibit various lighting properties depending on the nature of the surfaces. It sometimes may be desirable that light reflected from a particular surface satisfies one or more lighting property criteria. For example, it sometimes may be desirable that light reflected from different surfaces be relatively uniform. Thus, Applicants have recognized and appreciated that it would be beneficial to provide methods and apparatus for adjusting one or more properties of light emitted by a lighting unit so that when that light is reflected off a surface, it satisfies one or more lighting property criteria. In view of the foregoing, various embodiments and implementations of the present invention are directed to calibrating light emitted by a lighting unit to satisfy one or more criterion for reflected light.

Figure 1:
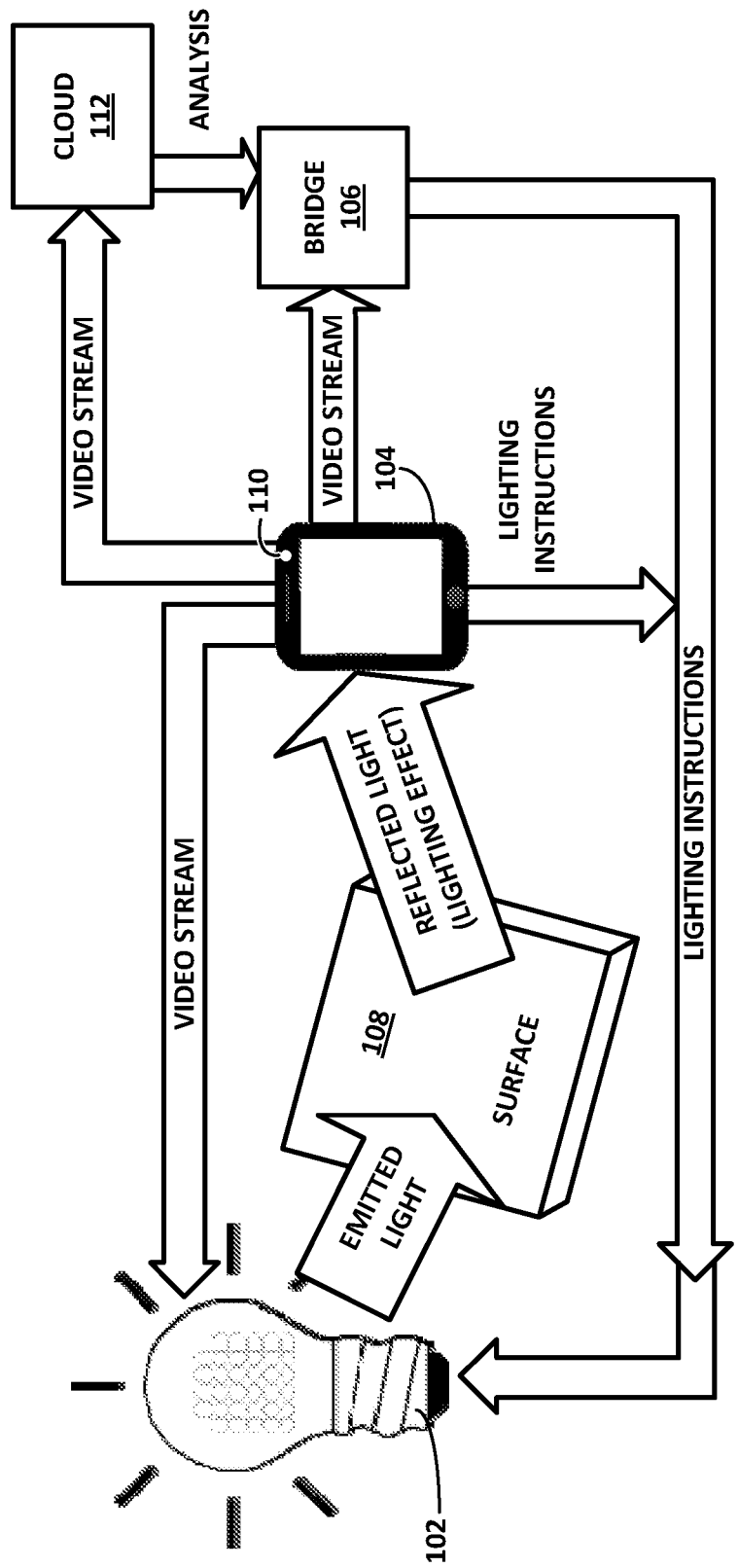
FIG. 1 illustrates one example of how various components may perform selected aspects of the present disclosure, in accordance with various embodiments.

Referring to FIG. 1, in one embodiment, a lighting unit 102 may come in various forms, such as the depicted LED bulb, or as an incandescent bulb, fluorescent bulb or tube, halogen bulb, and so forth. In various embodiments, lighting unit 102 may be controllable such that one or more properties of light it emits, including but not limited to hue, saturation, temperature, intensity, brightness, size, and so forth, may be adjusted.

In some embodiments, a user may interact with lighting unit 102 itself, e.g., using one or more buttons or knobs on lighting unit 102, or by operating a mobile computing device such as a tablet computer 104 or smart phone to communicate wirelessly with lighting unit 102. Various wireless technologies may be employed, such as ZigBee, WiFi (e.g., WiFi Direct), BlueTooth, coded light, NFC, and so forth. In other embodiments, a user may interact with lighting unit 102 indirectly. For instance, a user may operate a mobile computing device such as tablet 104 to communicate with a lighting system bridge 106, which in turn may provide lighting control instructions to lighting unit 102, e.g., using ZigBee, coded light, WiFi, wired communications, etc. Although smart phones and tablets are primarily described herein as example mobile computing devices, this not meant to be limiting. Mobile computing devices configured with selected aspects of the present disclosure may come in various other forms, including but not limited to laptop computers, wearable devices (e.g., watches, glasses, armbands), and so forth.

Referring now to the process flow depicted in FIG. 1, in various embodiments, lighting unit 102 may emit light onto a surface 108. That light may in turn be reflected off the surface such that it forms a visible lighting effect. If lighting unit 102 is configured to provide shaped lighting effects, e.g., a spotlight, then that lighting effect/reflected light may be in the desired shape. In other embodiments, the lighting effect/reflected light may simply be ambient light. The terms "lighting effect" and "reflected light" may be used interchangeably herein. While surface 108 is depicted as being relatively flat, that is not meant to be limiting. "Surface" as used herein may refer to a surface of any shape, size, consistency, texture, and so forth. For example, a painted wall is one type of surface, and the surface of an object such as a statue is another type of surface. Moreover, surface need not necessarily refer to an outermost surface. In the case of a wholly or partially translucent object, it indeed may not be the outer surface of the object that reflects the light. Rather, in some instances, it may be the surface of particles or other structure inside a translucent object that reflect light.

A mobile computing device such as tablet computer 104 may capture the reflected light, e.g., using a light sensor such as camera 110 (e.g., front- or rear-facing). The captured data, which in some embodiments may be stored as a digital image, may represent one or more properties of the reflected light. This data may be analyzed to determine whether a property of the reflected light satisfies a lighting property criterion. If not, light emitted by lighting unit 102 may be calibrated so that the resulting reflected light satisfies the lighting property criterion.

In various embodiments, the mobile computing device may analyze the captured data itself. For instance, tablet computer 104 may analyze the data captured by camera 110 to determine whether one or more lighting properties of the reflected light satisfies a lighting property criterion. In some embodiments, the lighting property criterion may be matching, as closely as is practicable, one or more properties of reflected light defined by a user and/or captured from another surface. In the latter case, the reflected light captured from the other surface may be stored in a digital image. If the lighting property criterion is not satisfied, then tablet computer 104 may cause calibration of light emitted by lighting unit 102 so that the reflected light satisfies the lighting property criterion. For example, tablet computer 104 may generate, or may cause lighting system bridge 106 to generate, one or more lighting instructions that, when provided to lighting unit 102 (e.g., wirelessly via NFC, Bluetooth, coded light or ZigBee), cause lighting unit 102 to alter the light it emits in an attempt to cause the reflected light to satisfy the lighting property criterion.

In other embodiments, instead of performing the analysis itself, the mobile computing device may outsource the analysis to a remote computing device. For example, in FIG. 1, tablet computer 104 may provide a video stream to the lighting system bridge 106, the lighting unit 102 itself (assuming it has circuitry capable of performing such analysis), or a remote computing server that, for instance, implements part of a "cloud" infrastructure 112. Lighting system bridge 106, lighting unit 102 and/or cloud 112 may then perform the analysis. In some embodiments, cloud 112 may provide data indicative of its analysis to bridge 106 (or even tablet computer 104). Bridge 106 may, either based on its own analysis or based on analysis performed by cloud 112, generate lighting instructions and transmit them to lighting unit 102. In embodiments where lighting unit 102 performs the analysis, it may generate its own lighting instructions internally.

Lighting unit 102 may implement the lighting instructions it receives from tablet computer 104 or bridge 106, or those it generates itself, to alter one or more properties of light it emits in an attempt to satisfy the lighting property criterion. For instance, assume the lighting property criterion is that the reflected light should have a certain intensity. Assume also that the intensity of the light reflected from surface 108 and captured by camera 110 of tablet computer 104 does not match that desired intensity, e.g., because surface 108 is a different color or texture than another surface (not depicted) from which the desired intensity was captured. Lighting unit 102 may adjust one or more properties of light it emits so that after that light is reflected from surface 108, it has the desired intensity, or at least is within an acceptable range of the desired intensity.

Obviously there will be instances where a lighting property criterion cannot be precisely met. For instance, assume the lighting property criterion was captured from another surface (not depicted) that was relatively reflective. If surface 108 is not particularly reflective (e.g., cloth or felt), then it may not be possible to exactly match light reflected from surface 108 to the lighting property criterion captured from the reflective surface. In such case, lighting unit 102 may simply adjust one or more properties of light it emits to bring the downstream reflected light as close as possible to matching the criterion.

Figure 2:
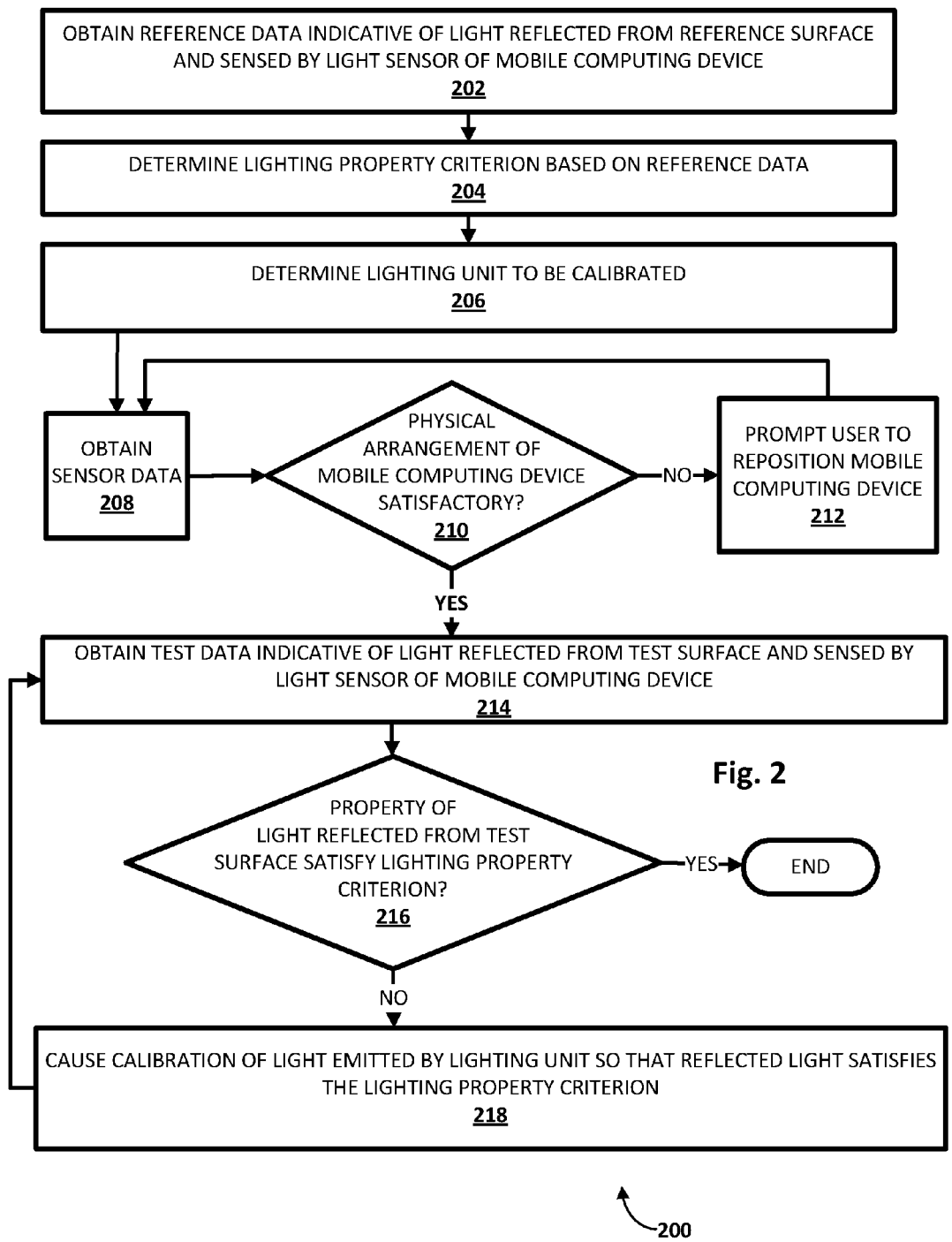
FIG. 2 depicts an example lighting control method, in accordance with various embodiments.

FIG. 2 depicts an example method 200 for lighting control, in accordance with various embodiments. Method 200 may be initiated in various ways, e.g., by a user initiating a calibration application on a mobile computing device such as tablet computer 104, or by a user bringing a mobile computing device close enough to a lighting unit to initiate wireless (e.g., NFC) communication between the lighting unit and the mobile computing device. Additionally or alternatively, in some embodiments, the mobile computing device may be brought close enough to the lighting unit to read computer-readable indicia on the lighting unit, such as a QR or bar code, or to read coded light emitted by the lighting unit. The mobile computing device may use this visually-obtained information to identify the particular lighting unit, e.g., so that when it later generates (or has generated by a lighting system bridge) lighting instructions, those instructions are provided to the correct lighting unit.

At block 202, reference data indicative of light reflected from a reference surface may be obtained, e.g., using a light sensor of a mobile device. For instance, a user may hold tablet computer 104 near a surface onto which light is being emitted in a manner that is desirable to the user (hence, the user wishes to use it as a reference). Tablet computer 104 may respond by capturing an image of the surface, e.g., using camera 110.

At block 204, a lighting property criterion may be determined, e.g., by tablet computer based on the reference data. For example, a particular lighting property represented in the reference data, such as brightness, color or size of the reflected light, may be stored, e.g., by tablet computer 104 or bridge 106, as one or more lighting property criteria. In some cases, a user may simply wish to reproduce the reflected light as a whole. In such case, data representative of a plurality of lighting properties, or even a captured image of the reflected light, may be saved. In other cases, a user may manually define one or more lighting property criteria, in which case block 202 may be omitted. In some embodiments, a user may manually adjust the lighting property criterion, e.g., by operating one or more sliders rendered on a touch screen of tablet computer 104 to select a desired brightness, hue, range of acceptable lighting property values, etc.

However the lighting property criterion is determined, at block 206, it may be determined, e.g., by a mobile device such as tablet computer 104 and/or another device such as bridge 106, that a particular lighting unit is to be calibrated. For example, after obtaining the reference data at block 202 and determining a lighting property criterion at block 204, the user may carry tablet computer 104 to a position proximate a lighting unit to be calibrated, such as lighting unit 102, in order to calibrate light emitted by that lighting unit to satisfy the generated lighting property criterion.

The determination at block 206 may occur in various ways. In some embodiments, the mobile computing device may establish direct wireless communication with the lighting unit, e.g., using WiFi Direct or NFC. In other embodiments, one or more other sensors of the mobile computing device or the lighting unit may detect that the mobile computing device is proximate the lighting unit, e.g., using one or more proximity sensors on the mobile computing device or the lighting unit itself. In some embodiments, one or more sensors of the mobile computing device or the lighting unit may detect that the mobile computing device is plugged into a dock that is integral with the lighting unit. In some embodiments, one or more sensors of the mobile computing device or the lighting unit may detect visible indicia on the other, such as bar and/or QR codes.

Once the determination is made at block 206, it may be determined whether the mobile computing device is properly positioned so that it may obtain test data from the lighting unit or the corresponding lighting effect. In some embodiments, at block 208, the mobile computing device may obtain various sensor data related to its physical arrangement. For instance, tablet computer 104 may determine its position and/or orientation using an accelerometer and/or a gyroscope. This data may be analyzed, e.g., by tablet computer 104, at block 210, to determine whether a physical arrangement of tablet computer 104 satisfies a physical arrangement criterion such that it will be able to properly measure light reflected from a surface near the lighting unit. For instance, if the surface to be measured (also referred to as the "test" surface) is parallel to the floor, the physical arrangement criterion may call for tablet computer 104 to be held parallel to the floor, so that a front- or rear-facing camera is pointed straight down.

If the answer at block 210 is no, then at block 212, tablet computer 104 may prompt the user to reposition tablet computer 104. For instance, tablet computer 104 may render instructions on a touch screen prompting the user to move and/or reorient tablet computer 104. In some embodiments, tablet computer 104 may provide tactile and/or audio feedback (e.g., tones, vibrations, spoken instructions, etc.) to assist the user in appropriately orienting and/or positioning tablet computer 104. Method 200 may then proceed back to block 208. Blocks 208-212 may be repeated until tablet computer 104 is properly positioned and/or oriented to measure reflected light created by the lighting unit to be calibrated. If the answer at block 210 is yes, then method 200 may proceed to block 214.

Proper positioning of the mobile computing device may be ensured in other ways as well. For instance, in some embodiments, an NFC chip may be disposed in a lighting unit such that the NFC chip is only able to communicate with an NFC interface in a mobile computing device if the mobile computing device is properly positioned (e.g., parallel to the lighting unit and/or touching or nearly touching the lighting unit). This may ensure, for instance, that a front or rear-facing camera of the mobile computing device is facing in a particular direction, so that a reference or test lighting effect may be properly captured.

At block 214, test data indicative of light reflected from a test surface may be obtained, e.g., by camera 110 of tablet computer 104. For example, tablet computer 104 may cause camera 110 to take a picture or video of the test surface. In some embodiments, the mobile computing device may additionally or alternatively create white light while obtaining the test data, e.g., using a flash. This additional data may be used to obtain a reference color of the surface.

At block 216, it may be determined, based on the test data obtained at block 214, whether the predetermined lighting criterion is satisfied. For instance, tablet computer 104 may analyze the test data, or may outsource the analysis to bridge 106 or cloud 112, to determine whether one or more properties of the reflected light have values that are within predetermined ranges of reference values forming part of the lighting property criterion. If the answer is yes, then method 200 may end.

If the answer is no, however, then at block 218, tablet computer 104 (or bridge 106) may cause lighting unit 102 to calibrate its emitted light in an attempt to satisfy the predetermined lighting criterion. In embodiments where the test data obtained at block 214 included a white light measurement of a reference color of the surface, that reference color may be taken into account when determining how to alter the light emitted by lighting unit 102 to satisfy the lighting property criterion. Blocks 214-218 may be repeated until the lighting property criterion is satisfied.

Figure 3:
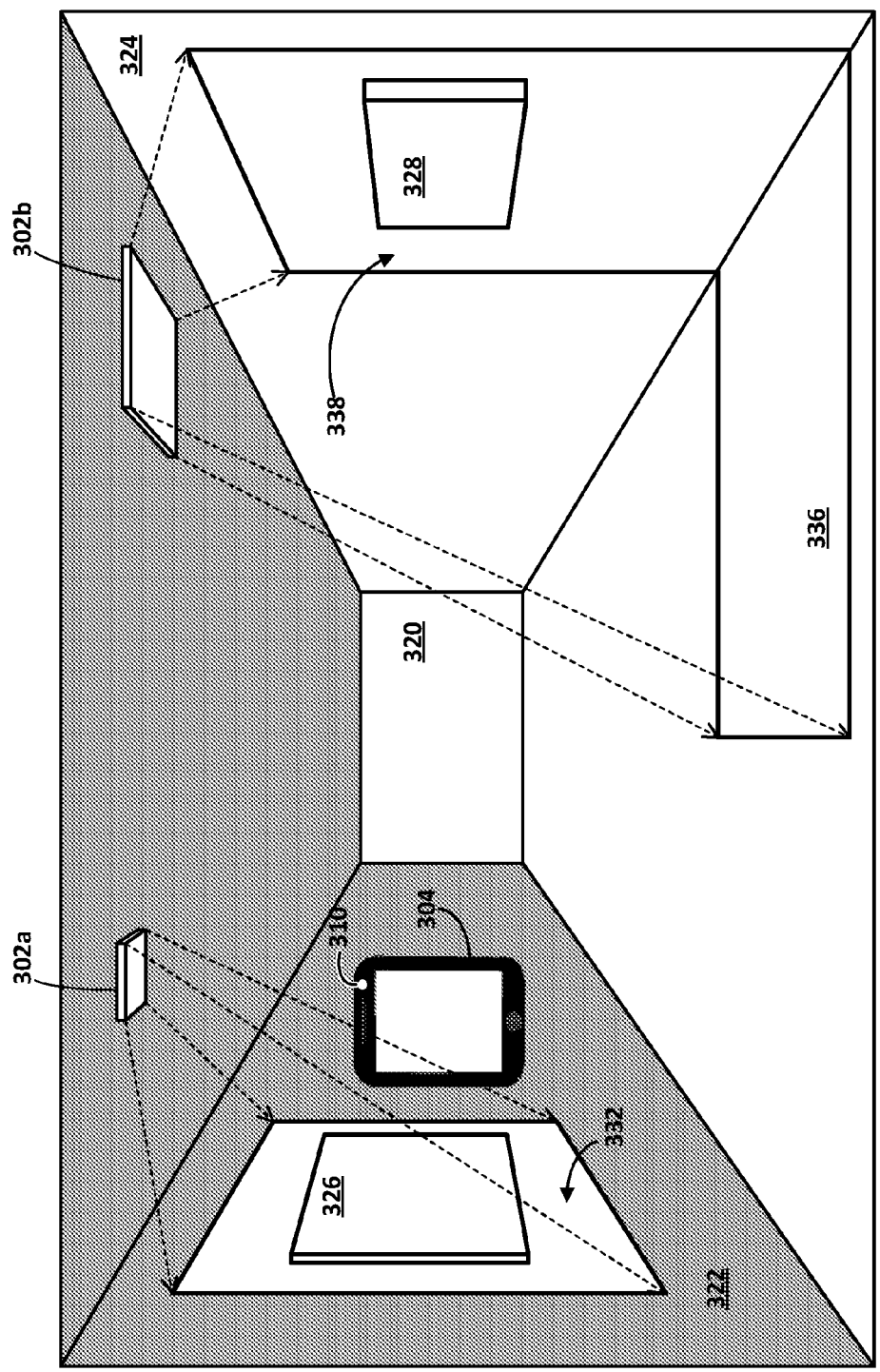
FIGS. 3 and 4 depict examples of how disclosed techniques may be used to control lighting, in accordance with various embodiments.

FIG. 3 depicts an example scenario in which disclosed techniques may be implemented. A hallway 320 includes a first wall 322 and a second, opposite wall 324. A first painting 326 is hanging on first wall 322, and a second painting 328 is hanging on second wall 324. A first lighting unit 302a, which may be a luminaire, casts light onto and around first painting 326 to create a first lighting effect 332. A second lighting unit 302b, which also may be a luminaire, casts light onto and around second painting 328, as well as onto floor 336, to create a second lighting effect 338. It can be seen that second lighting unit 332 is much larger than first lighting unit 302a, and casts a larger lighting effect.

Assume that light effect 332 on and around first painting 326 is desirable, or has one or more properties (e.g., hue, saturation, intensity, etc.) that is desirable. As depicted in FIG. 3, a user may bring a mobile computing device such as tablet computer 304 into proximity with first lighting unit 302a. A camera 110 on the mobile computing device may capture a reference image from which it may determine one or more lighting property criteria corresponding to one or more properties of light effect 332.

The user may then carry tablet computer 304 near second lighting unit 302b (e.g., to the right in FIG. 3). Once tablet computer 304 establishes communication (e.g., using NFC, Bluetooth, etc.) with second lighting unit 302b, or is brought sufficiently close to second lighting unit 302b, tablet computer 304 may capture, e.g., using camera 310, an image of second lighting effect 338. Tablet computer 304 may then analyze the captured data, or may outsource the analysis to a bridge or cloud (not shown in FIG. 3), to determine whether second lighting effect 338 satisfies one or more lighting property criteria determined from first lighting effect 332. If not, then tablet computer 304 may generate and transmit to second lighting unit 302b (or to a bridge, not shown) a lighting instruction. The lighting instruction may cause second lighting unit 302b to adjust the light it emits so that second lighting effect 338 satisfies the lighting property criterion. In some embodiments, by taking the actions described in association with FIG. 3, a user may effectively "copy" first lighting effect 332 and "paste" it onto second lighting effect 338.

Figure 4:
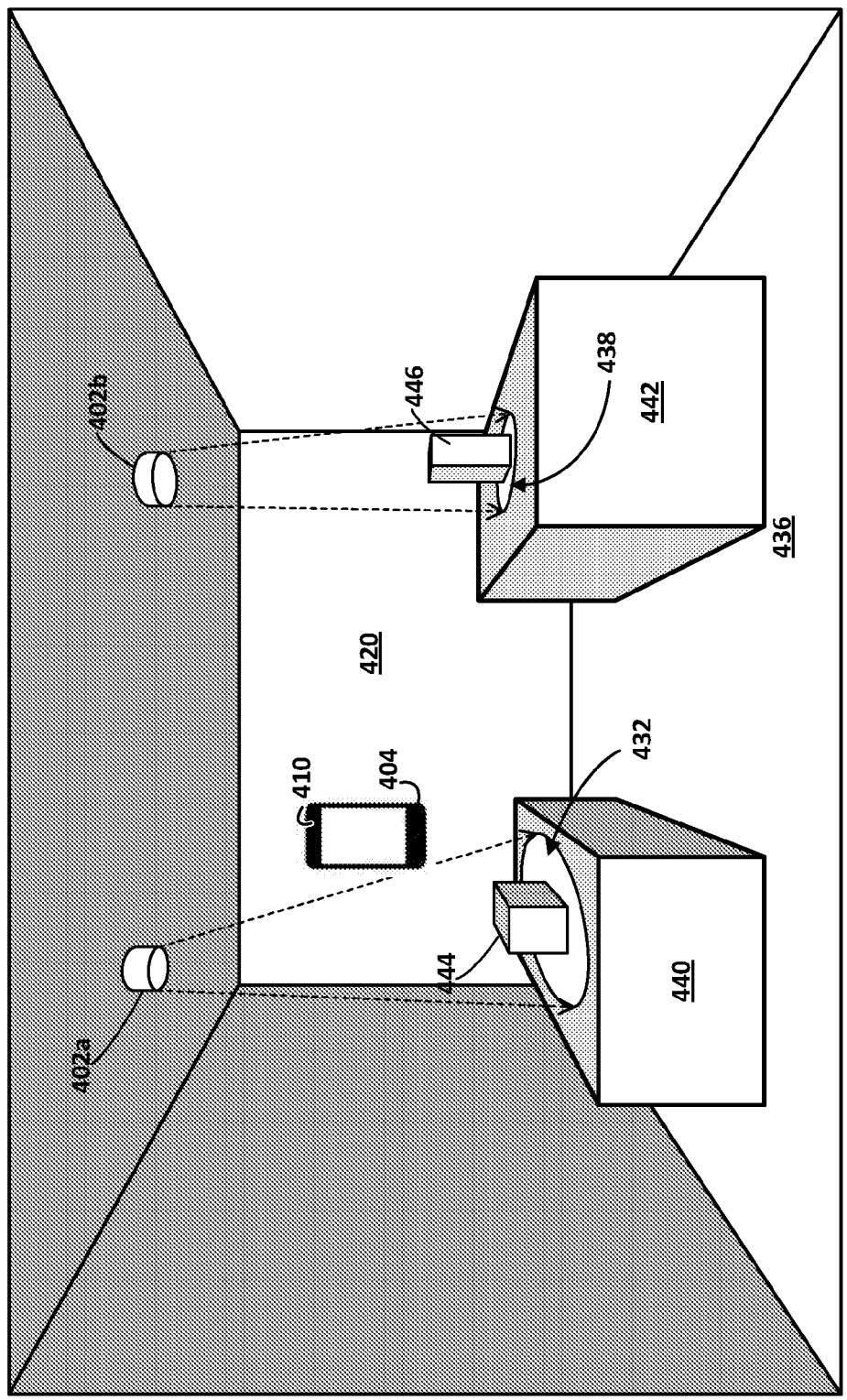

FIG. 4 depicts an environment 420 in which disclosed techniques may be implemented in other ways. Many of the components are similar to those depicted in FIG. 3, and thus are numbered similarly (except with a "4" instead of a "3" in front). A first lighting unit 402a projects a first lighting effect 432 (in the form of a spot) onto a first platform 440, and a second lighting unit 402b projects a second lighting effect 438 (also in the form of a spot) onto a second platform 442. First lighting effect 432 is larger than second lighting effect 438.

In some embodiments, a user may wish to calibrate second lighting unit 402b so that that first lighting effect 432 and second lighting effect 438 share the lighting property "diameter." One way to accomplish this would be to bring a smart phone 404 equipped with selected aspects of the present disclosure into proximity with first lighting unit 402a and/or first lighting effect 432. Camera 410 may then be used to capture reference data (e.g., a digital image) that represents a size (e.g., a diameter) of first lighting effect 432. From this reference data, a lighting property criterion of diameter=x, where x equals the diameter of first lighting effect 432, may be generated.

Next, the user may bring smart phone 404 into proximity with second lighting unit 402b and/or second lighting effect 438. Once smart phone 404 is properly positioned, e.g., by performing operations associated with blocks 208-212 of FIG. 2, camera 410 may be used to capture test data. Smart phone 404 may then analyze the test data, or may outsource analysis of the test data to another computing device. Based on this analysis, it may be determined that second lighting effect 438 has a diameter y that is smaller than the diameter x of first lighting effect 432, and therefore fails to satisfy the lighting property criterion. Accordingly, smart phone 404 may cause calibration of second lighting unit 402b, directly (e.g., using NFC) or indirectly (e.g., via a lighting system bridge using WiFi, ZigBee, etc.), such that second lighting unit 402b alters light it emits so that second lighting effect 438 has a diameter that matches, or is at least within a predetermined range of, a diameter of first lighting effect 432.

In some embodiments, smart phone 404 or another similar mobile computing device may be equipped with one or more gyroscopes or accelerometers such that it is capable of automatically detecting its distance from the surface on which the lighting effect is projected. That way, smart phone 404 may compensate for a difference between the distance and/or angle it was held relative to first lighting effect 432 compared to the second lighting effect 438. However, in instances where smart phone 404 is not so equipped, it may be desirable to ensure that the user hold smart phone 104 the same distance from second lighting effect 438 as the user held smart phone 404 from first lighting effect 432. This may be accomplished, for instance, by configuring smart phone 404 to perform operations similar to those performed at blocks 208-212 of FIG. 2.

As another example, and with continued reference to FIG. 4, a user may desire that a lighting effect occupy a particular amount of space surrounding an object. In FIG. 4, a first object 444 is placed on first platform 440 and illuminated by first lighting unit 402a. A second object 446 is placed on second platform 442 and illuminated by second lighting unit 402b. Assume a user manually defines (e.g., selected by the user by operating a touch screen of smart phone 404) a lighting property criterion requiring that a light spot surrounding the objects 444 and 446 be sized such that a distance from an outer surface of the object to the boundary of the light spot is a particular length. The user may bring smart phone 404 into proximity with the respective lighting effect (432 or 438) and/or the respective lighting unit (402a or 402b), and camera 410 may capture test data. This test data may be analyzed, e.g., by smart phone 404 or a remote computing device, against the lighting property criterion defined by the user. In some cases, boundaries of the respective object (444 or 446) may be detected in the data. If the analysis reveals that the lighting property criterion is not satisfied, smart phone 404 may cause the respective lighting unit to be calibrated such that light it emits is altered to bring the respective lighting effect into conformance with the lighting property criterion. For example, one or more LEDs of a plurality of LEDs on a lighting unit may be selectively energized to grow or shrink the size of the spot. In this respect, the size of the lighting effect may depend in part on the size of the object.

As an alternative to manually defining the amount of space around an object that a lighting effect should occupy, a user may use smart phone 404 and camera 410 to obtain reference data from an object that is illuminated with a lighting effect that the user considers to occupy a desirable amount of space around the object. This reference data may be used to define the lighting property criterion. Then, and similar to as described above, the user may carry smart phone 404 to other lighting units illuminating other objects, and may "paste" the desired lighting effect onto those respective lighting effects.

When "copying" and "pasting" lighting properties across lighting effects, it may be simplest to use the same mobile computing device with the same camera to avoid differences in camera capabilities and characteristics, etc. However, it is not necessary. In some embodiments, two different mobile computing devices with two different cameras having distinct characteristics could nonetheless be used to copy and paste lighting properties across lighting effects. In such embodiments, one or more characteristics of the respective cameras may be accounted for, such that data obtained from both cameras is normalized. For instance, if a "copying" camera has less megapixels than a "pasting" camera, the pixels of the pasting camera could be normalized to those of the "copying" camera, e.g., by ignoring some pixels. Likewise, if a "copying" camera has more megapixels than a "pasting" camera, the pixels of the pasting camera could be normalized to those of the "copying" camera, e.g., by interpolation. As another example, if data captured by the "copying" camera is stored in a particular format, then the data stored by the "pasting" camera may be stored in the same or similar format. In some embodiments, data formats that exhibit little or no lossiness (e.g., RAW format) may be used by the "copying" camera, so that it is simpler to normalize other images to those captured by the "copying" camera.

Figure 5:
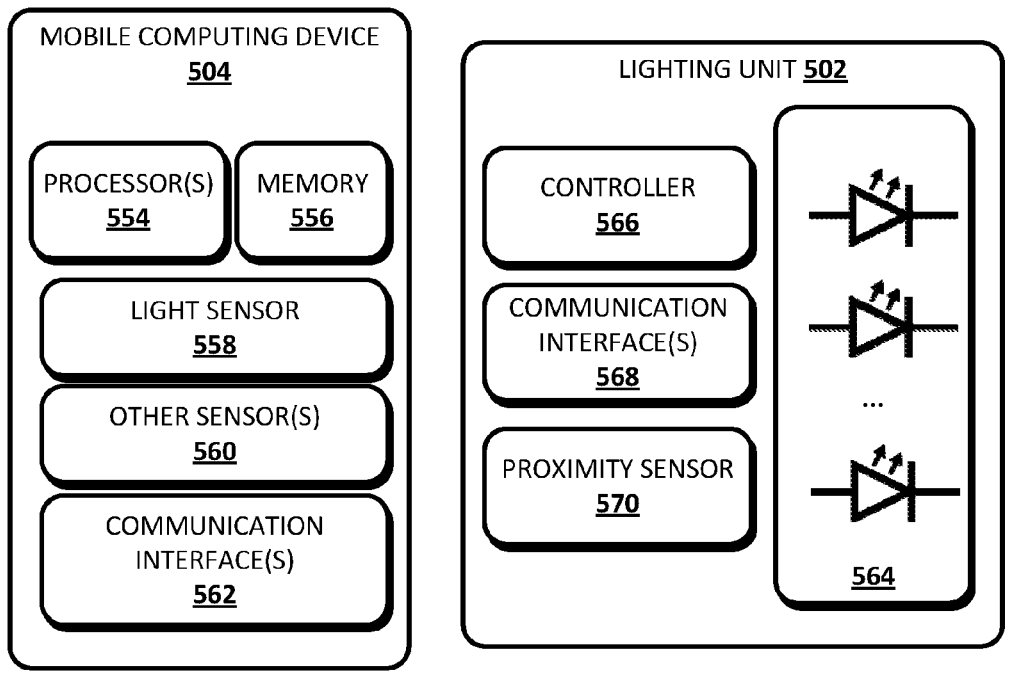
FIG. 5 depicts example components of lighting units and mobile computing devices described herein, in accordance with various embodiments.

FIG. 5 depicts example components of a mobile computing device 504 and a lighting unit 502. Mobile computing device 504 may include one or more processors 554 that may be operably coupled with memory 556. Also coupled with one or more processors 554 are a light sensor 558 (e.g., cameras 110 or 410), other sensors 560 (e.g., accelerometer, gyroscope, GPS, etc.), and one or more wireless communication interfaces 562 (e.g., WiFi, cellular, ZigBee, NFC, Bluetooth, coded light, etc.). In various embodiments, one or more processors 554 may be configured to execute instructions stored in memory 556 to perform selected aspects of method 200, as well as other selected techniques described herein.

Lighting unit 502 may include one or more light sources, depicted as a plurality of LEDs 564 in FIG. 5. Lighting unit 502 may also include a controller 566, one or more communication interfaces 568 (e.g., WiFi, cellular, ZigBee, NFC, Bluetooth, coded light, etc.) that may be used to communicate with, for instance, mobile computing device 504. Lighting unit 502 may also include a proximity sensor (e.g., passive infrared or a physical dock) configured to detect when mobile computing device 504 is nearby. In various embodiments, controller 566 may be configured to perform selected aspects of the present disclosure, including one or more selected aspects of method 200. In various embodiments, a lighting system bridge 106 may have similar components as mobile computing device 504, including but not limited to one or more processors 554, memory 556 and one or more communication interfaces 562.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. It should also be understood that, unless clearly indicated to the contrary, in any methods claimed herein that include more than one step or act, the order of the steps or acts of the method is not necessarily limited to the order in which the steps or acts of the method are recited.

Reference numerals appearing in the claims between parentheses, if any, are provided merely for convenience and should not be construed as limiting the claims in any way.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A computer-implemented method comprising:
   obtaining data indicative of light reflected from a surface and sensed by a light sensor of a mobile computing device, wherein the reflected light is created from light emitted by a lighting unit;
   obtaining, from one or more other sensors associated with the mobile computing device, data indicative of a physical arrangement of the mobile computing device;
   determining, based on the data indicative of the physical arrangement of the mobile computing device, whether the physical arrangement of the mobile computing device fails to satisfy a physical arrangement criterion;
   determining based on the data representing one or more properties of the reflected light, that a property of the reflected light fails to satisfy a lighting property criterion; and
   causing calibration of light emitted by the lighting unit so that the reflected light satisfies the lighting property criterion.

2. The method of claim 1, wherein the lighting property criterion is satisfied when a value of the property of the reflected light falls within a range of values.

3. The method of claim 2, further comprising determining the range of values from an image of light emitted by another lighting unit onto another surface.

4. The method of claim 2, further comprising determining the range of values based on user selection.

5. The method of claim 2, further comprising determining the range of values based on a desired size of a projected light effect.

6. The method of claim 1, wherein the obtaining is performed in response to a determination that the mobile computing device is within a predetermined proximity of the lighting unit.

7. The method of claim 1, wherein the obtaining is performed in response to a determination that the mobile computing device is in wireless communication with the lighting unit.

8. The method of claim 1, further comprising:
   causing the mobile computing device to provide output prompting a user to alter the physical arrangement of the mobile computing device to satisfy the physical arrangement criterion.

9. The method of claim 8, wherein the physical arrangement includes an orientation or location of the mobile computing device relative to the lighting unit or the surface.

10. A computer-readable medium comprising instructions that, in response to execution of the instructions by a mobile computing device or lighting system bridge, cause the mobile computing device or lighting-system bridge to perform the method of claim 1.

11. The computer-implemented method of claim 1, wherein the obtaining, determining and causing are performed by the mobile computing device.

12. The computer-implemented method of claim 1, wherein the obtaining, determining and causing are performed by a bridge that controls a lighting system with which the lighting unit is associated.

13. The computer-implemented method of claim 1, wherein the obtaining, determining and causing are performed by a computing server in communication with the mobile computing device over one or more computer networks.

14. The computer-implemented method of claim 1, wherein the obtaining, determining and causing are performed by the lighting unit.

15. A mobile computing device, comprising:
   one or more processors;
   a light sensor operably coupled with the one or more processors; and
   memory operably coupled with the one or more processors and storing a lighting property criterion and instructions that, in response to execution of the instructions by the one or more processors, cause the one or more processors to:
   obtain data indicative of light reflected from a surface and sensed by the light sensor, wherein the reflected light is created from light emitted by a lighting unit;
   obtain, from one or more other sensor operably coupled with the one or more processors, data indicative of a physical arrangement of the mobile computing device;
   determine, based on the data indicative of the physical arrangement of the mobile computing device, whether the physical arrangement of the mobile computing device fails to satisfy a physical arrangement criterion;
   determine, based on the data indicative of the reflected light, that a property of the reflected light fails to satisfy the lighting property criterion; and
   cause calibration of light emitted by the lighting unit so that the reflected light satisfies the lighting property criterion.

16. The mobile computing device of claim 15, wherein the memory further stores instructions that, in response to execution of the instructions by the one or more processors, cause the one or more processors to obtain the data indicative of light reflected from the surface in response to a determination that the mobile computing device is within a predetermined proximity of the lighting unit.

17. The mobile computing device of claim 15, wherein the memory further stores instructions that, in response to execution of the instructions by the one or more processors, cause the one or more processors to obtain the data indicative of light reflected from the surface in response to a determination that the mobile computing device is in wireless communication with the lighting unit.

18. The mobile computing device of claim 15, further comprising the one or more other sensors wherein the memory further stores instructions that, in response to execution of the instructions by the one or more processors, cause the one or more processors to:
provide output prompting a user to alter the physical arrangement of the mobile computing device to satisfy the physical arrangement criterion.

19. A lighting system bridge, comprising:
one or more processors; and
memory operably coupled with the one or more processors and storing a lighting property criterion and instructions that, in response to execution of the instructions by the one or more processors, cause the one or more processors to:
determine that a mobile computing device is within a predetermined proximity of a lighting unit of the lighting system;
obtain, from the mobile computing device, data indicative of light reflected from a surface and sensed by a light sensor associated with the mobile computing device, wherein the reflected light is created from light emitted by the lighting unit;
obtain, from one or more sensors associated with the mobile computing device, data indicative of a physical arrangement of the mobile computing device;
determine, based on the data indicative of the physical arrangement of the mobile computing device, whether the physical arrangement of the mobile computing device fails to satisfy a physical arrangement criterion;
determine, based on the data representing one or more properties of the reflected light, that a property of the reflected light fails to satisfy the lighting property criterion; and
calibrate light emitted by the lighting unit so that the reflected light satisfies the lighting property criterion.

20. The lighting system bridge of claim 19, wherein the instructions stored in the memory further cause the one or more processors to:
cause the mobile computing device to provide output prompting a user to alter the physical arrangement of the mobile computing device to satisfy the physical arrangement criterion.

* * * * *